(No Model.)
G. CROMPTON & H. WYMAN.
MECHANICAL MOVEMENT.
No. 336,626. Patented Feb. 23, 1886.
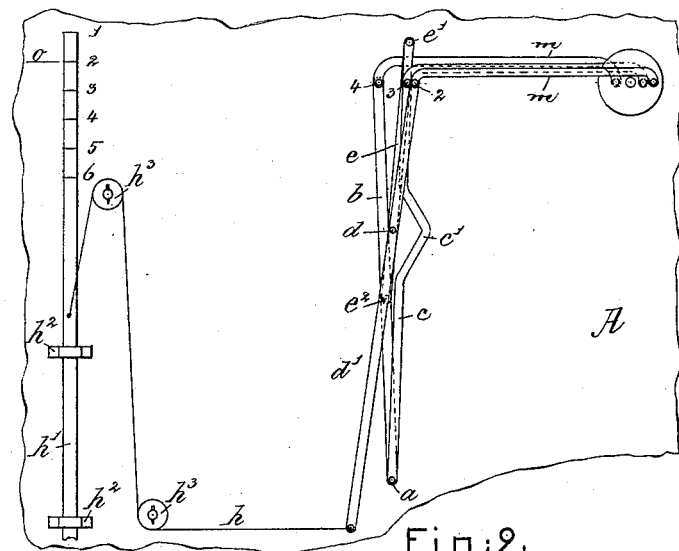
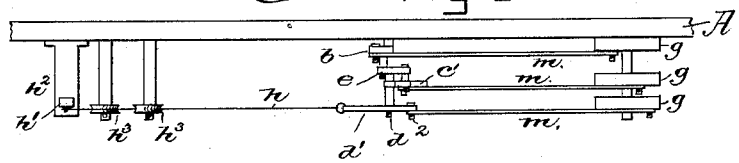
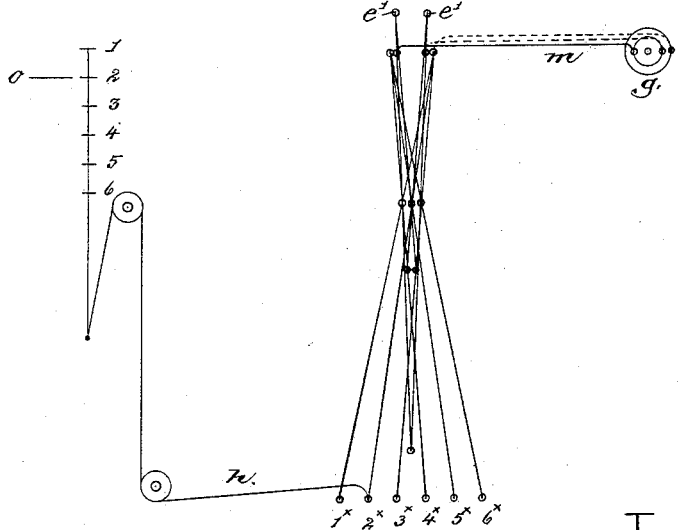
Witnesses.
Arthur Zipperlen.
John F. C. Prindlert.
Inventors.
George Crompton
Horace Wyman
by Crosby Gregory Attys.

UNITED STATES PATENT OFFICE.

GEORGE CROMPTON AND HORACE WYMAN, OF WORCESTER, MASSACHUSETTS; SAID WYMAN ASSIGNOR TO SAID CROMPTON.

MECHANICAL MOVEMENT.

SPECIFICATION forming part of Letters Patent No. 336,626, dated February 23, 1886.

Application filed October 21, 1885. Serial No. 180,499. (No model.)

*To all whom it may concern:*

Be it known that we, GEORGE CROMPTON and HORACE WYMAN, of Worcester, county of Worcester, and State of Massachusetts, have invented an Improvement in Mechanical Movements, of which the following description, in connection with the accompanying drawings, is a specification, like letters on the drawings representing like parts.

This invention has for its object the production of a novel and simple mechanism whereby a bar or rod may be reciprocated for different distances in one or the other direction, and be left at rest in either one of several defined positions, the time occupied in the movement of the rod being the same, whether it is made to pass from one to its next position or from its extreme positions.

United States Patent No. 281,842, dated July 24, 1883, and granted to us for improvement in mechanical movements, shows a main lever mounted on a fixed fulcrum. The main lever has pivoted upon it an auxiliary lever, the pivot or fulcrum of the latter being midway of its ends, and the main lever is moved into any one of four positions by the action against the edges of the auxiliary lever of studs on carrier-levers moved by connecting-rods and cranks.

In our present invention, in order to gain a greater range of motion and a greater number of stopping-points for the end of the main lever, or for a rod or bar attached to it, we have employed two carrier-levers, have joined them together by a link, and upon the link we have mounted a main lever, and we have connected one end of the main lever and of each of the carrier-levers to a separate connecting-rod actuated by a crank.

Our invention consists in the combination, with two carrier-levers, a connecting-link, and a lever mounted on the said link, of a connecting-rod for each of the said levers, and a crank to move each of the said connecting-rods, substantially as described.

Figure 1 in elevation represents a series of levers and devices constituting our improved mechanical movement; Fig. 2, a top view thereof, and Fig. 3 a diagram representing different positions of the different parts.

The frame A has pivoted upon it at $a$ the two carrier-levers $b\ c$, the one, $c$, being herein shown as the longer, and as having a bend or space at $c'$ to not interfere with the fulcrum $d$ of the main lever $d'$, the said fulcrum being carried by the link $e$, which is pivoted at $e'$ to the end of the carrier-lever $c$, and at $e^2$ to the carrier-lever $b$ at a point between the pivot $a$ of the two carrier-levers $b\ c$ and the fulcrum $d$ of the main lever $d'$.

The wheels $g$ are all alike, and their cranks and the connecting-rods are substantially as in our United States Patent No. 281,842, dated July 24, 1883, for improvement in mechanical movements, and in practice the said wheels and connecting-rods will be moved as described in the said patent.

One of the connecting-rods, $m$, is jointed at 2 to the main lever $d$. Another connecting-rod is jointed to the lever $c$ at the point 3 a short distance from its end, and between the point $c'$ and the fulcrum $d$, a third connecting-rod being jointed to the end of the lever $b$ at 4.

The crank of the wheel $g$ moving the connecting-rod, which is attached to the main lever $d'$, is a little farther from the center of the said wheel than are the cranks on the wheels which carry the connecting-rods that are attached to the levers $b$ and $c$.

The main lever $d'$ is herein shown as joined by a cord or chain, $h$, to a slide bar or rod, $h'$, held in guides $h^2$, the said cord or chain being extended over sheaves $h^3\ h^3$. The slide or bar is numbered with lines 1 to 6, and the frame is provided with a station-mark, designated by $o$.

The numbers $1^\times$ to $6^\times$, Fig. 3, show the six different positions in which the end of the lever $d'$ may be placed by moving the levers $b$ and $c$ and the lever $d'$ on its movable fulcrum $d$, carried by the auxiliary lever.

In the mechanical movement described in the patent referred to, the free end of the main lever could be made to assume only four different positions; but herein the end of the said main lever, or, if desired, the rod or bar $h'$, connected with it, may be made to occupy any one of six positions, and be brought from any one into any other of its different positions in the same time and from either direction.

The diagram Fig. 3 shows the different positions that the respective levers may be made to assume by a semi-rotation, or nearly so, of the cranks.

By using all the cranks in the same direction at the same time the free or lower end of the main lever $d'$ may be placed in its extreme positions $1^\times$ or $6^\times$, and by moving some of the cranks in one and some in the opposite direction the said free end of the said lever may be made to occupy any one of the other positions $2^\times$, $3^\times$, $4^\times$, or $5^\times$, as will be readily understood by those conversant with mechanical movements of the class herein referred to.

In another application, Serial No. 176,856, we have shown a main lever pivoted at one end to an auxiliary lever, the fulcrum of the said main lever between its pivotal point and its free end being on a fulcrum-lever, and being movable, as therein described.

We claim—

The herein-described mechanical movement, consisting of the two carrier-levers pivoted at $a$, the link $e$, connected loosely with the said carrier-levers, and the main lever having its fulcrum on the said link, and three connecting-rods and cranks to move the said carrier and main levers, substantially as described, whereby the free end of the main lever may be moved into any one of six different positions at will, as set forth.

In testimony whereof we have signed our names to this specification in the presence of two subscribing witnesses.

GEORGE CROMPTON.
HORACE WYMAN.

Witnesses:
J. A. WARE,
G. W. GREGORY.